(12) United States Patent
Bilal et al.

(10) Patent No.: US 11,089,489 B2
(45) Date of Patent: Aug. 10, 2021

(54) LOW ENERGY WIRELESS COMMUNICATION DEVICES, SYSTEMS, AND METHODS

(71) Applicant: KING ABDULLAH UNIVERSITY OF SCIENCE AND TECHNOLOGY, Thuwal (SA)

(72) Inventors: Rana Muhammad Bilal, Thuwal (SA); Atif Shamim, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 16/486,339

(22) PCT Filed: Mar. 6, 2018

(86) PCT No.: PCT/IB2018/051446
§ 371 (c)(1),
(2) Date: Aug. 15, 2019

(87) PCT Pub. No.: WO2018/163070
PCT Pub. Date: Sep. 13, 2018

(65) Prior Publication Data
US 2020/0015100 A1    Jan. 9, 2020

Related U.S. Application Data

(60) Provisional application No. 62/469,210, filed on Mar. 9, 2017.

(51) Int. Cl.
*H04B 7/00* (2006.01)
*H04W 24/02* (2009.01)
(Continued)

(52) U.S. Cl.
CPC ............ *H04W 24/02* (2013.01); *H04W 4/80* (2018.02); *H04W 8/005* (2013.01); *H04W 64/003* (2013.01); *H04W 84/18* (2013.01)

(58) Field of Classification Search
CPC ....... H04W 24/02; H04W 4/80; H04W 8/005; H04W 64/003; H04W 84/18
(Continued)

(56) References Cited

U.S. PATENT DOCUMENTS 9,743,254 B2* 8/2017 Friday ................... G01S 5/0278
10,028,199 B2* 7/2018 Friday ................ H04W 40/244
(Continued)

FOREIGN PATENT DOCUMENTS

WO    2017082812 A1    5/2017

OTHER PUBLICATIONS

Byun, D., et al., "S-Beacon: Next Generation BLE Beacon Solution for Enhanced Personalization," 2016 IEEE International Conference on Consumer Electronics, Jan. 7, 2016, pp. 166-167.
(Continued)

*Primary Examiner* — April G Gonzales
(74) *Attorney, Agent, or Firm* — Patent Portfolio Builders PLLC

(57) ABSTRACT

A low energy wireless communication beacon broadcasts an advertisement using a low energy wireless communication protocol. Information is communicated between the low energy wireless communication beacon and a server over a backhaul communication link using the low energy wireless communication protocol.

20 Claims, 7 Drawing Sheets

(51) Int. Cl.
  *H04W 4/80*   (2018.01)
  *H04W 8/00*   (2009.01)
  *H04W 64/00*  (2009.01)
  *H04W 84/18*  (2009.01)

(58) Field of Classification Search
  USPC .......................................................... 455/41.2
  See application file for complete search history.

(56) References Cited

U.S. PATENT DOCUMENTS

| | | | |
|---|---|---|---|
| 10,219,166 B2* | 2/2019 | Friday | H04W 4/80 |
| 10,387,918 B2* | 8/2019 | Jabara | H04W 4/029 |
| 2013/0099920 A1* | 4/2013 | Song | G08B 21/0277 |
| | | | 340/539.13 |
| 2013/0100819 A1* | 4/2013 | Anchan | H04W 48/20 |
| | | | 370/241 |
| 2013/0203036 A1* | 8/2013 | Jabara | G06Q 30/0207 |
| | | | 434/350 |
| 2013/0231088 A1* | 9/2013 | Jabara | H04L 12/5692 |
| | | | 455/411 |
| 2015/0289088 A1* | 10/2015 | Terrazas | H04M 3/5116 |
| | | | 455/404.2 |
| 2015/0304941 A1* | 10/2015 | Syrjarinne | G01S 1/04 |
| | | | 455/41.2 |
| 2016/0072896 A1* | 3/2016 | Petersen | H04W 4/021 |
| | | | 709/227 |
| 2016/0133134 A1* | 5/2016 | Todasco | G07B 15/02 |
| | | | 705/13 |

OTHER PUBLICATIONS

International Search Report in corresponding/related International Application No. PCT/IB2018/051446, dated Jun. 14, 2018.
Written Opinion of the International Searching Authority in corresponding/related International Application No. PCT/IB2018/051446, dated Jun. 14, 2018.

* cited by examiner

LOW ENERGY WIRELESS COMMUNICATION DEVICES, SYSTEMS, AND METHODS

CROSS-REFERENCE TO RELATED APPLICATIONS

This application is a U.S. National Stage of International Application No. PCT/IB2018/051446, filed on Mar. 6, 2018, which claims priority and benefit from U.S. Provisional Application 62/469,210, filed Mar. 9, 2017, the entire contents of which are incorporated herein by reference.

BACKGROUND

Technical Field

Embodiments of the subject matter disclosed herein generally relate to low energy wireless communication devices, systems, and methods employing a same low energy wireless communication protocol for both local and backhaul communications.

Discussion of the Background

The continuing decrease of the size and cost of low energy wireless communication chips has expanded the applications of these chips beyond conventional communication devices to many devices that had never before been connected to a network. This has spawned the term Internet of Things (IoT) to describe the connection of various disparate types of devices beyond conventional communication devices. One of the most popular and widely-used IoT enabling technology is Bluetooth Low Energy (BLE) beacons.

Google and Apple have both developed their own proprietary beacon formats using BLE, which are known as Eddystone and iBeacon, respectively. A common application of a BLE beacon is for communication with endpoint wireless communication devices, such as smartphone. For example, BLE beacons can be used as part of a system to provide targeted advertising or other information to an endpoint wireless communication device proximately located to a BLE beacon.

FIG. 1 illustrates a conventional system implementing BLE beacons. A BLE beacon 102, which includes a BLE wireless communication radio, has a communication radius 104 within which it can communicate with an endpoint wireless communication device 106, such as a smartphone, tablet, laptop computer, etc. The communication radius 104, which is dependent on a multitude of factors (e.g., transmit power, receiver sensitivity, path loss, antenna gains etc.), typically can be defined by the transmitting power of the BLE beacon 102. BLE provides for communication radii in the range of 5 m to 100 m. The endpoint wireless communication device 106 has a BLE wireless communication radio that scans for advertisements transmitted by the BLE beacon 102. Accordingly, when endpoint wireless communication device 106 is scanning using its BLE wireless communication radio within the communication radius 104, the endpoint wireless communication device 106 receives one of the advertisements over the BLE wireless communication link 108, which is a low energy wireless communication link. The BLE wireless communication radio in the endpoint wireless communication device 106 passes the advertisement or advertisement related information to a wide area network wireless communication radio in the endpoint wireless communication device 106, which uses a wide area communication network link 110 to communicate the advertisement via a network 112 to a server 114. The wide area network communication link 110 in this example can be a cellular radio network communication link (e.g., GSM, GPRS, 3G, 4G, 5G, etc.), a WiFi communication link or any other type of wide area network communication link. The wide area communication network link 110 operates at a higher energy than the BLE wireless communication link 108, which is one why the BLE wireless communication link 108 is commonly referred to as a low energy wireless communication link. Thus, although the term low energy is a relative term, those skilled in the art would understand the scope of low energy wireless communications, low energy wireless communication links, and low energy wireless communication protocol. The communication from the network 112 to server 114 can involve one or more additional wide area network communication links 116, which can comprise wired and/or wireless communication links.

The server 114 processes the received advertisement in order to obtain associated information, such as a targeted advertisement or other information, and then provides the associated information to the endpoint wireless communication device 106 via wide area network communication links 110 and 116. Upon receipt of the associated information, the endpoint wireless communication device can provide, e.g., display, the associated information to a user of the endpoint wireless communication device 106. It will be appreciated by those skilled in the art that the communication link between the BLE beacon 102 and endpoint wireless communication device 106 is a local communication link and the communication links used to exchange information between endpoint wireless communication device 106 and server 114 are backhaul communication links.

This arrangement requires the endpoint wireless communication device 106 to coordinate the BLE wireless communication protocol communications and the wide area network protocol communications. An example of this is illustrated in FIGS. 2A and 2B, which respectively illustrate the wireless communications performed by the BLE beacon 102 and those performed by the endpoint wireless communication device 106. As illustrated in FIG. 2A, a BLE beacon 102 transmits advertisements $202_1$-$202_x$ at regular intervals with no transmissions between the advertisement transmissions. Referring now to FIG. 2B, the endpoint wireless communication device 106 performs a number of periodic scanning intervals $204_1$-$204_x$ using its BLE wireless radio to receive advertisements transmitted by the BLE beacon 102. Assuming, as in the case in FIG. 1, the endpoint wireless communication device 106 is within the communication radius 104 of the BLE beacon 102 during one of the scanning intervals $204_1$-$204_x$, the endpoint wireless communication device 106 will receive one of the advertisements $202_1$-$202_x$ transmitted by BLE beacon 102 during one of the scanning intervals $204_1$-$204_x$ using its BLE wireless radio. The endpoint wireless communication device 106 then communicates with server 114, via network 112 and wide area network communication links 108 and 116, using a wide area network radio, which operates according to a different protocol than its BLE wireless radio, during one of the wide area network transmission time periods $206_1$-$206_x$.

This arrangement requires the endpoint wireless communication device 106 to perform the backhaul communication of the advertisement from the BLE beacon 102 to server 114 and the receipt of the information associated the advertisement from server 114 using a wide area network radio. Thus, endpoint wireless communication device 106 must have both a BLE wireless radio and a wide area network radio. Although it is common for endpoint wireless communication devices to have both types of radios, this arrangement requires the endpoint wireless communication device 106 to use its own wide area network communication link, which can result in charges to the user of the endpoint wireless communication device 106 for the information transmitted over wide area network communication link. Some users may not wish to consume their monthly data allotment for this type of service.

Management of a network of BLE beacons in this arrangement is problematic. The most common network management technique is to employ a mobile application on an endpoint wireless communication device to configure each of the BLE beacons, which requires the endpoint wireless communication device to be within radio range of each BLE beacon. Although this may be just a matter of inconvenience for a small deployment of a few BLE beacons, many BLE beacon networks can involve tens or hundreds of BLE beacons arranged over a large area, which requires a large amount of time to configure the entire network of BLE beacons. Another way to configure BLE beacons is to embed the network management functions in an application on a user's endpoint wireless communication device, which would configure the BLE beacons when the user's device is within radio range of a BLE beacon. This consumes memory, processing energy, and data of the user's endpoint wireless communication device, which may not be acceptable to many users.

Further, the requirement for the endpoint wireless communication device 106 to have both a BLE wireless radio and a wide area network radio limits the applications of BLE beacon technology because wide area network radios are significantly more expensive than BLE wireless radios.

Another way to implement BLE beacon technology is to require the BLE beacon to have both a BLE wireless radio and a wide area network radio, which allows endpoint wireless communication devices to have only a BLE wireless radio. An example of such an arrangement is illustrated in FIG. 3. In this arrangement, BLE beacon 302 has two communication radii, radius $304_A$ corresponds to the communication range of the BLE wireless radio and defines the range of the local communication link and radius $304_B$ corresponds to the communication range of the wide area network radio and defines the range of the backhaul communication link. Also in this arrangement, the endpoint wireless communication device 106 sends an advertisement to the BLE beacon 302 using a BLE wireless communication link 308. The BLE beacon 302 then performs the backhaul communication with the server 314 via network 312 and wide area communication network links 310 and 316. The wide area network communication link 310 in this example can be a Wi-Fi communication link, a ZigBee communication link, or a cellular radio network communication link.

This arrangement requires the BLE beacon 302 to coordinate the communications with endpoint wireless communication device 306 via BLE communication link 308 and with server 314 via wide area network communication links 310 and 316. An example of this is illustrated in FIG. 4, in which the blocks above the horizontal line are associated with BLE wireless communication protocol and the blocks below the horizontal line are associated with wide area network wireless communication protocol. Specifically, the BLE beacon 302 sends advertisements $402_1$-$402_x$ at periodic intervals and scans for other BLE beacons during scanning intervals $404_1$-$404_x$, which are idle time periods between each advertisement transmission intervals $402_1$-$402_x$. Also, the BLE beacon 306 uses its wide area network radio to communicate with the server 314 during periods $406_1$-$406_x$, which are periods between the advertisement intervals $402_1$-$402_x$.

Because the BLE beacons in this arrangement have both a BLE radio and a wide area network wireless radio, each BLE beacon can configure itself using the wide area network wireless radio without requiring a user's endpoint device. However, wide area network wireless radios are significantly more expensive than BLE radios, and thus the cost of each BLE beacon is increased, and in turn the total cost of a BLE beacon network in this arrangement can be cost prohibitive.

Accordingly, there is a need for methods, devices, and systems that can configure BLE beacons without requiring a user's endpoint device or requiring the BLE beacons to have both a BLE radio and a wide area network wireless radio. Further, there is a need for methods, devices, and systems employing BLE beacons to provide information to and receive information from endpoint wireless communication devices without requiring the endpoint wireless communication device to have a wide area network wireless radio.

SUMMARY

According to an embodiment, there is a method, which involves a low energy wireless communication beacon broadcasting an advertisement using a low energy wireless communication protocol and communicating information between the low energy wireless communication beacon and a server over a backhaul communication link using the low energy wireless communication protocol.

According to an embodiment, there is a low energy wireless communication beacon, which includes a processor, a memory coupled to the processor, and a low energy wireless communication radio coupled to the processor. The processor is configured to control the low energy wireless communication radio to communicate with an endpoint wireless communication device using a low energy wireless communication protocol and communicate information over a backhaul communication link using the low energy wireless communication protocol.

According to a further embodiment, there is a system, which includes a first low energy wireless communication beacon communicatively coupled to an endpoint wireless communication device via a low energy wireless communication protocol, a second low energy wireless communication beacon communicatively coupled to the first low energy wireless communication beacon via the low energy wireless communication protocol, and a server communicatively coupled to the second low energy wireless communication beacon via the low energy wireless communication protocol. The first and second low energy wireless communication beacons each have only a single radio, which is capable of communicating exclusively using the low energy wireless communication protocol.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of beacons employing BLE as a low energy wireless radio communication protocol but the embodiments are equally applicable to any type of beacons employing a low energy wireless radio communication protocol.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
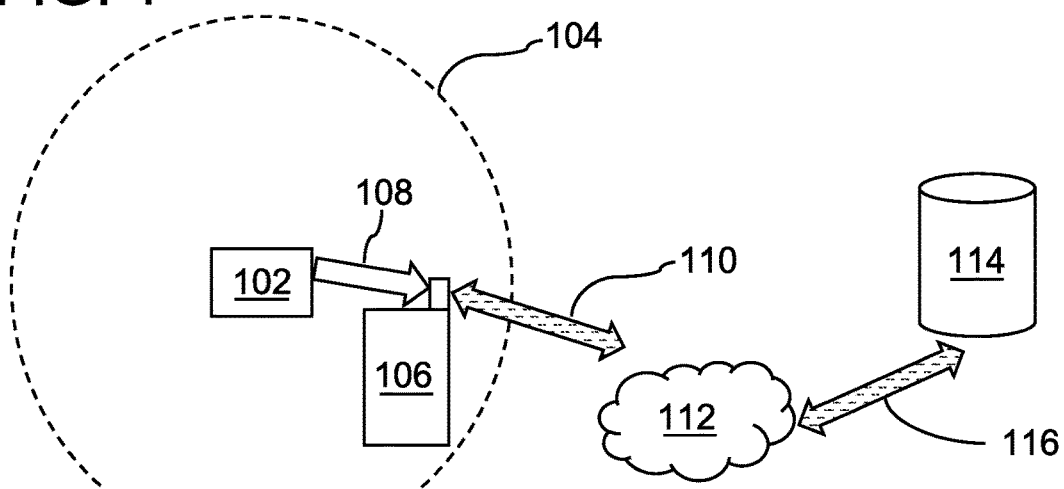
FIG. 1 is a schematic diagram of conventional BLE beacon system.
Figure 2A:
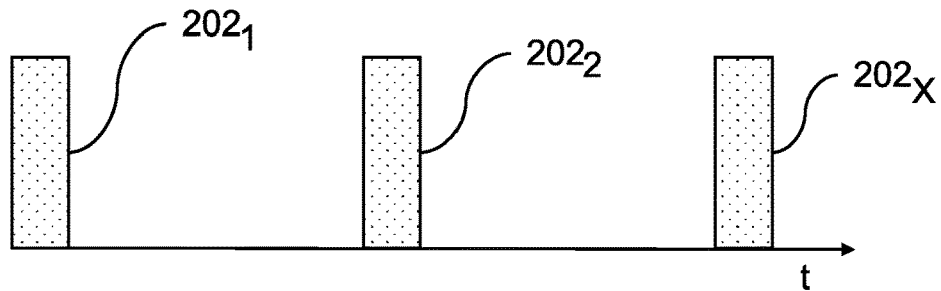
FIGS. 2A and 2B are timing diagrams of a conventional BLE beacon communication in the system of FIG. 1.
Figure 2B:
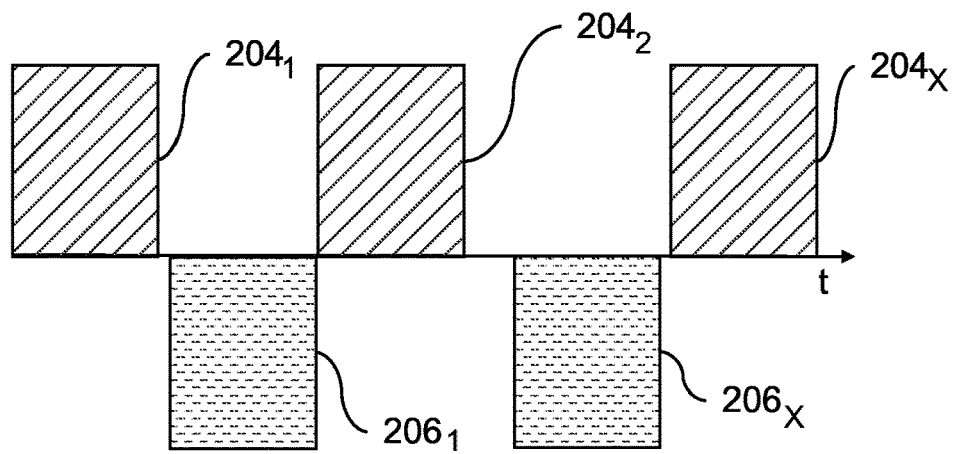
Figure 3:
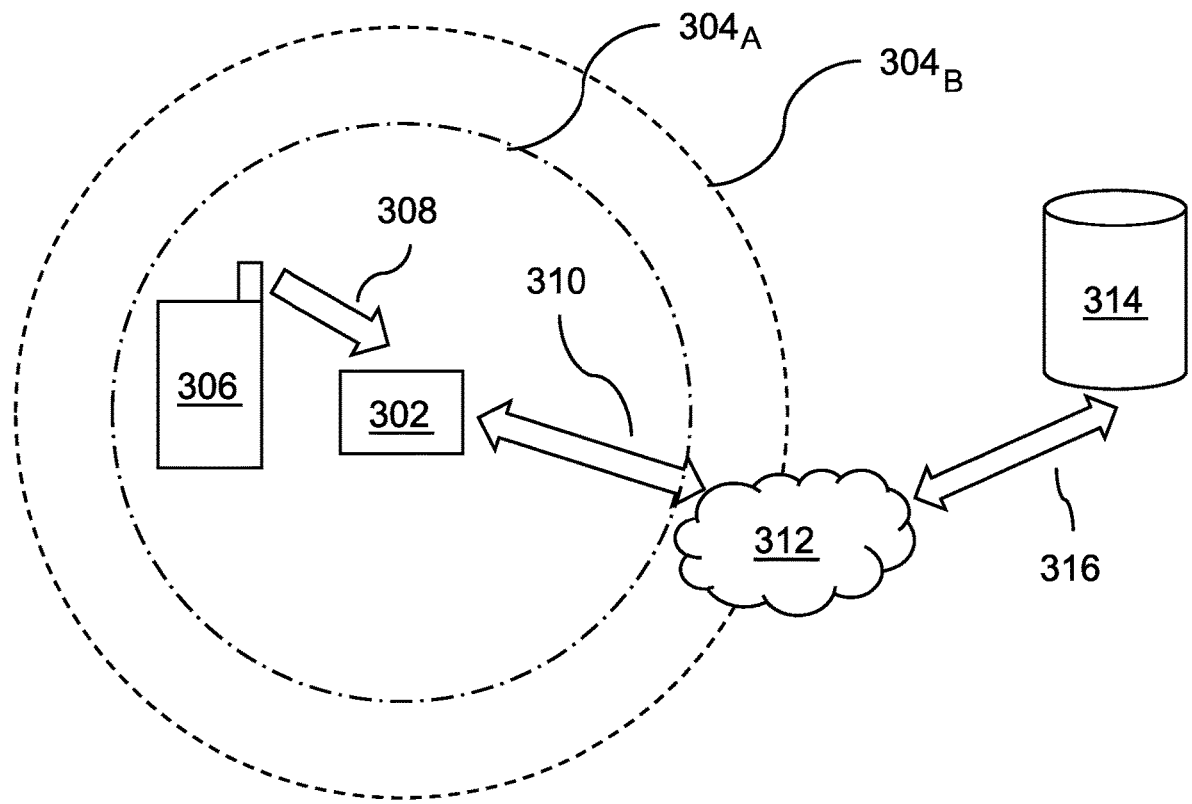
FIG. 3 is a schematic diagram of another conventional BLE beacon system.
Figure 4:
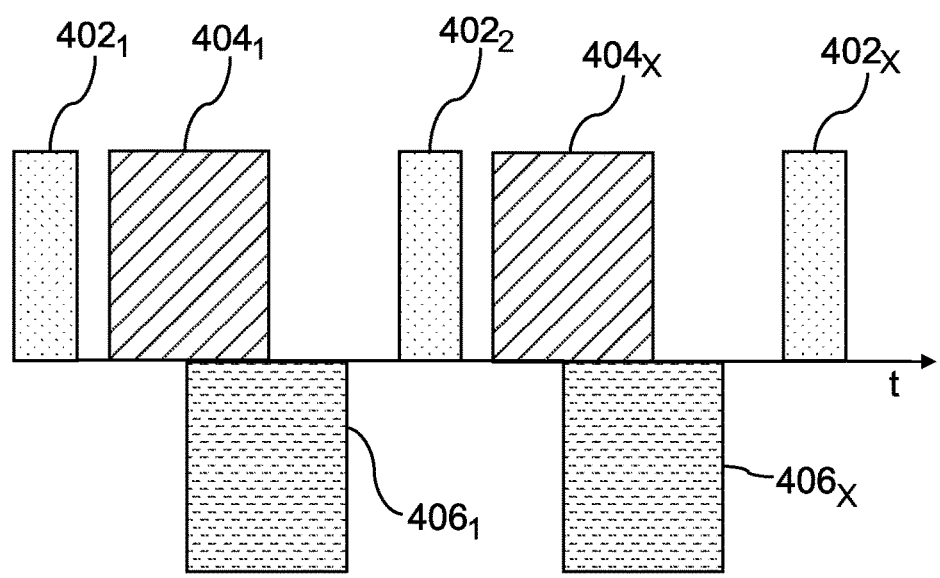
FIG. 4 is a timing diagram of a conventional BLE beacon communication in the system of FIG. 3.
Figure 5A:
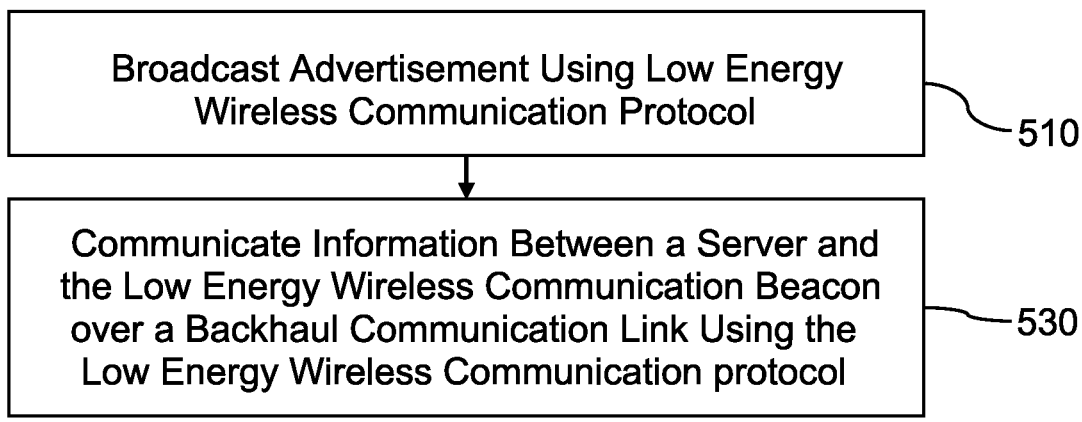
FIGS. 5A and 5B are flow charts of methods according to embodiments.

Referring now to FIG. 5A, according to an embodiment, a low energy wireless communication beacon broadcasts an advertisement using a low energy wireless communication protocol (step 510). Information is communicated between the low energy wireless communication beacon and a server over a backhaul communication link using the low energy wireless communication protocol (step 530).

The information communicated between the low energy wireless communication beacon and the server can include, for example, advertisements transmitted by the server, device configuration information for any of the devices, including the low energy wireless communication beacon and the endpoint wireless communication device, advertisement configuration information (e.g., the number of bytes, intervals, type, and routing information for the advertisements) for any of the devices, including the low energy wireless communication beacon and the endpoint wireless communication device, device or sensor status information (e.g., battery level, sensor readings, etc.) for any of the devices, including the low energy wireless communication beacon and the endpoint wireless communication device, and the like.

It should be recognized that the flow chart of FIG. 5A describes only some of the steps in a method that can be performed according to embodiments. Additional steps can be performed, such as those illustrated in FIG. 5B, which involves steps in addition to those in FIG. 5A. After broadcasting an advertisement (step 510), the low energy wireless communication beacon can scan for advertisements using the low energy wireless communication protocol (step 520). After communicating information between the low energy wireless communication beacon communicates and the server (step 530), the low energy wireless communication beacon can perform actions based on information received from the server (step 540). For example, if the information is device or advertisement configuration information, the low energy wireless communication beacon can adjust its device or advertisement configuration according to the received information and then operate according to the adjusted configuration. In some implementations, the low energy wireless communication beacon can then communicate the information received from the server to the endpoint wireless communication device (step 550). Because step 550 is implementation-specific, it is an optional step illustrated using dashed lines.

Figure 5B:
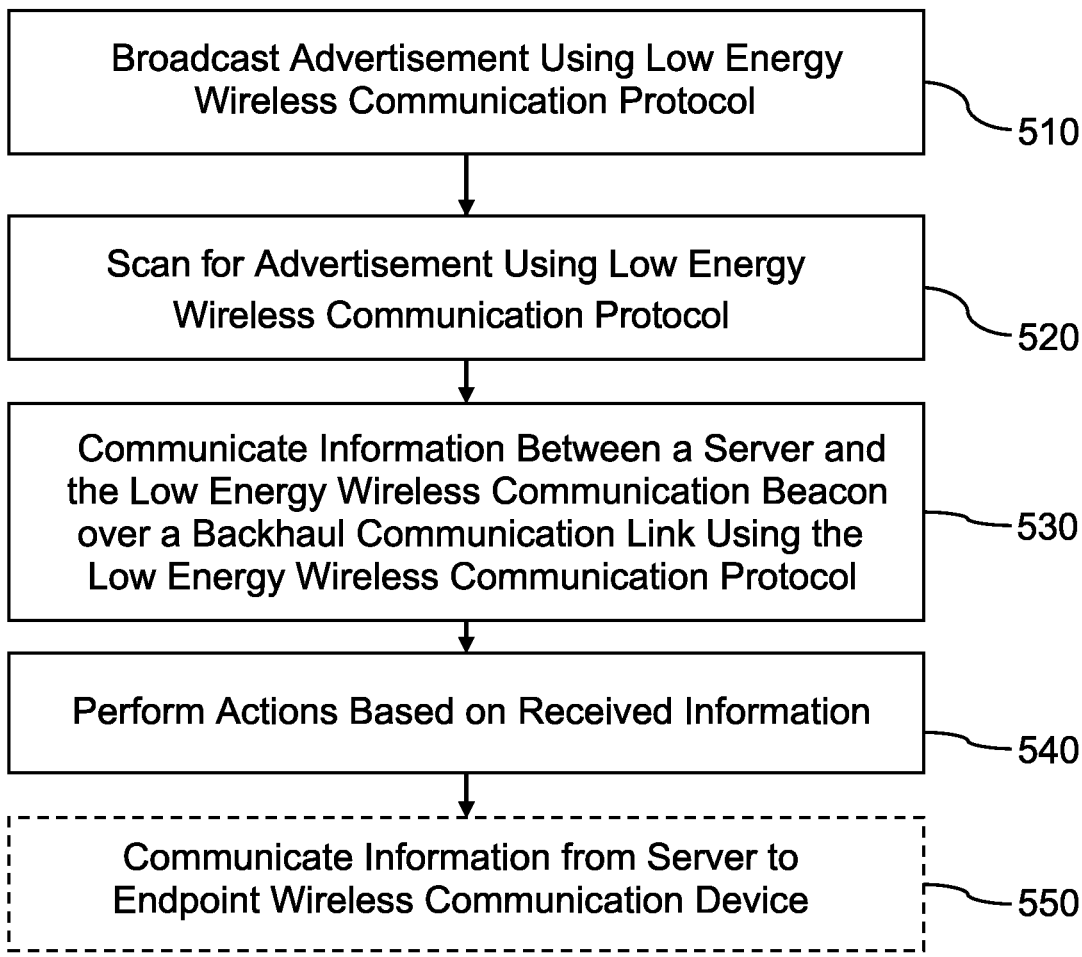

The flow chart in FIGS. 5A and 5B are, for ease of illustration and not limitation, illustrated with the steps being performed in a particular order. It should be recognized that the steps can be performed in a different order than what is illustrated and not all the steps need to be performed. For example, the information exchanged between the server and the low energy wireless communication beacon (step 530) may not be intended for the particular low energy wireless communication beacon, and thus the low energy wireless communication beacon may not perform any actions based on the received information, or the action can be to forward the information to the intended recipient. Further, depending upon timing requirements, the low energy wireless communication beacon may scan for advertisements prior to broadcasting an advertisement.

Figure 6:
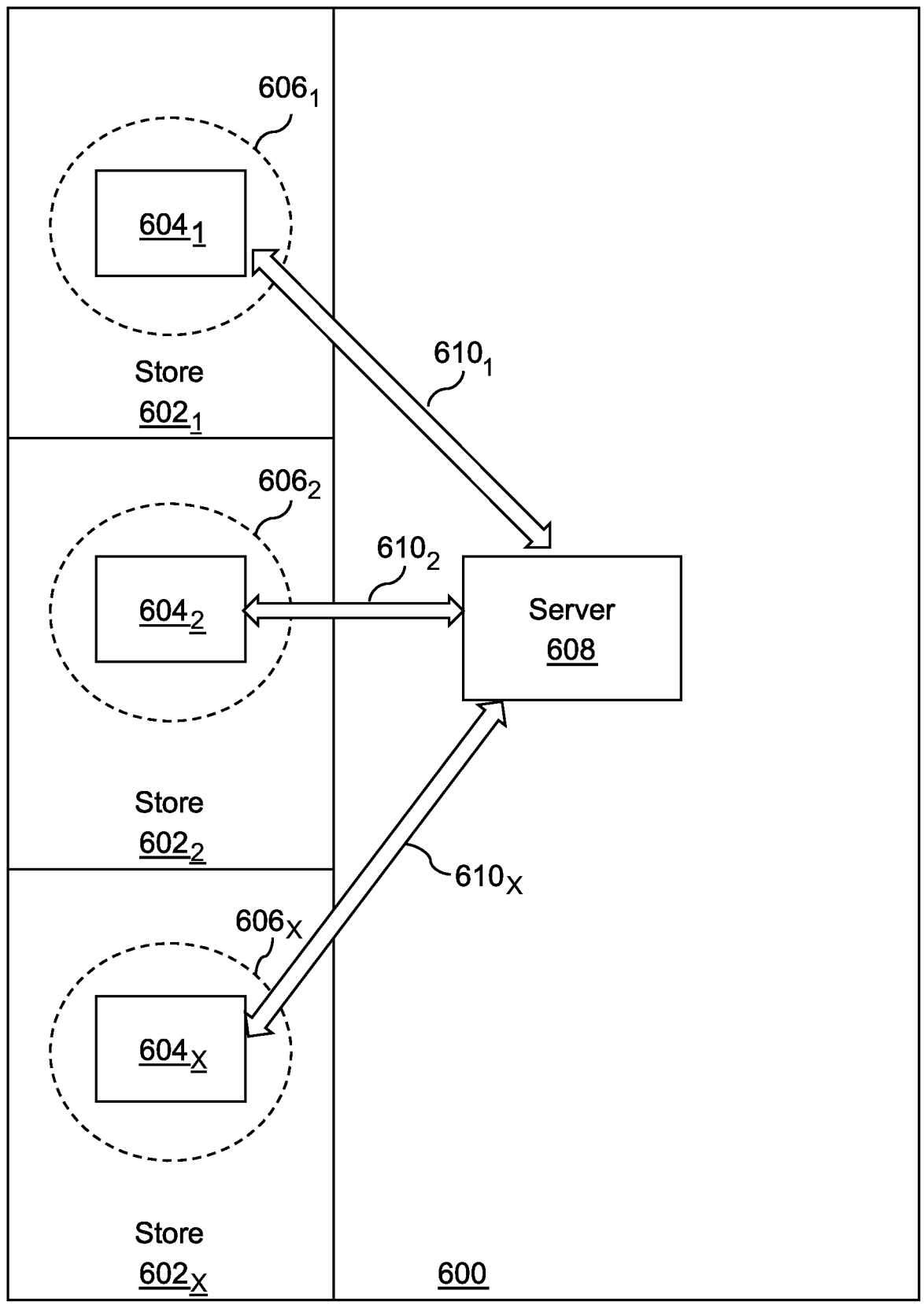
FIG. 6 is a schematic diagram of an implementation of low energy wireless communication beacons in a shopping mall according to an embodiment.
Figure 8:
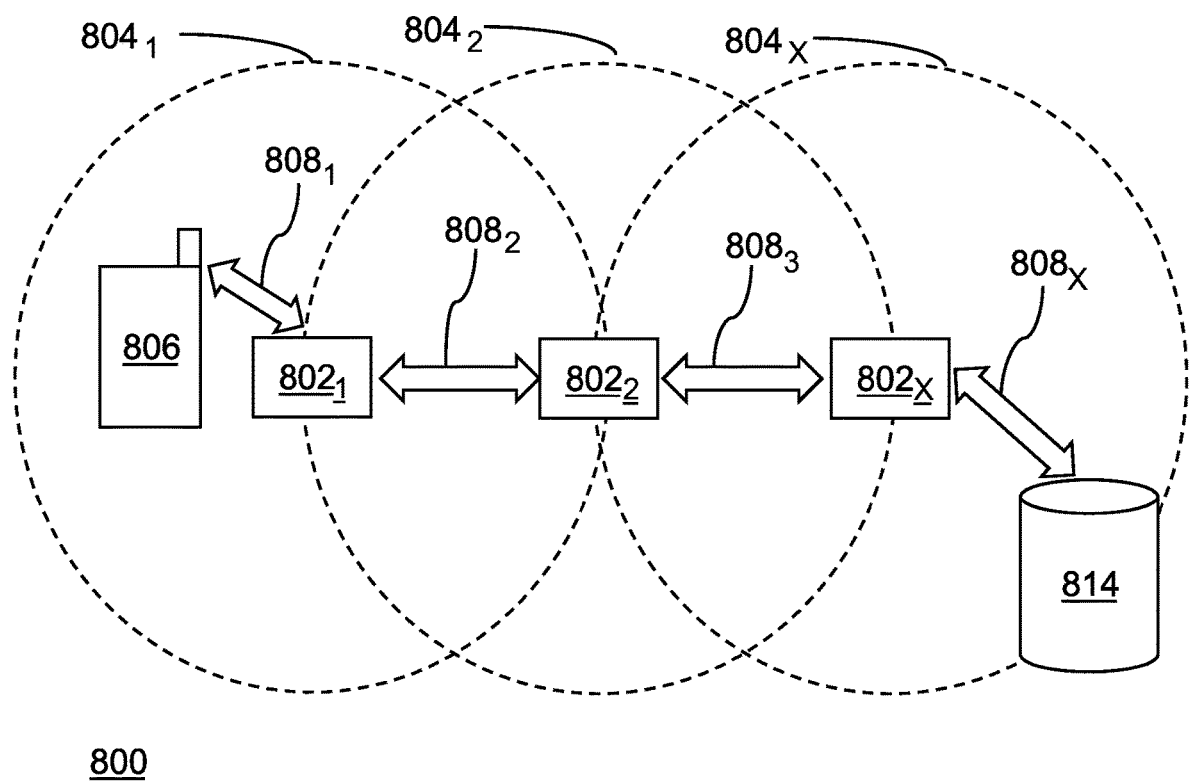
FIG. 8 is a block diagram of a low energy wireless communication network according to an embodiment.

Implementations of the low energy wireless communication beacons according to embodiments will now be described in connection with a shopping mall 600 illustrated in FIG. 6. The shopping mall includes a number of stores $602_1$-$602_x$, each having at least a respective low energy wireless communication beacon $604_1$-$604_x$. If the store is large, more than one low energy wireless communication beacon may be used. Each low energy wireless communication beacon $604_1$-$604_x$ can have a corresponding communication radius $606_1$-$606_x$ and communicates with an endpoint wireless communication device (not illustrated) within this radius using a low energy wireless communication protocol. The low energy communication beacons $604_1$-$604_x$ communicate among themselves as discussed later with regard to FIG. 8. In one embodiment, one or more of the low energy communication beacons $604_1$-$604_x$ may directly communicate with a server 608 using a corresponding communication link $610_1$-$610_x$, using the same low energy wireless communication protocol as illustrated in FIG. 8, or one of the low energy wireless communication beacon $604_1$-$604_x$ can use a low energy wireless communication link to another one or more of the low energy wireless communication beacon $604_1$-$604_x$, which has a low energy wireless communication link to the server 608 (an example of which is discussed in more detail below in connection with FIG. 8). If a low energy communication beacon communicates with another low energy communication beacon, using the low energy communication protocol discussed above, its range may be longer than the range for communicating with the endpoint wireless communication device shown in FIG. 6.

As one possible embodiment for a location tracking implementation, when an endpoint wireless communication device is within communication radius $606_1$, it sends an advertisement to low energy wireless communication beacon $604_1$, which then forwards an identification of the endpoint wireless communication device to server 608, via a path formed with other low energy wireless communication beacons. The server 608 can then determine the location of the endpoint wireless communication device based either on a previously obtained location of low energy wireless communication beacon $604_1$ or from location information transmitted along with the identification of the endpoint wireless communication device. Low energy wireless communication beacons $604_2$-$604_x$ operate in a similar manner for tracking the location of endpoint wireless communication devices within their vicinity.

It should be recognized that due to the size of the communication radius of beacons $604_1$-$604_x$, an endpoint wireless communication device should only provide an advertisement to a low energy wireless communication beacon located most proximately to the endpoint wireless communication device. Thus, an endpoint wireless communication device located in store $602_2$ will transmit its advertisement to low energy wireless communication beacon $604_2$ and not to low energy wireless communication beacons $604_1$ or $604_x$ so that the location of the endpoint wireless communication device is accurately tracked. Those skilled in the art will appreciate that even if an advertisement from endpoint wireless communication device is received by more than one low energy wireless communication beacons, the advertisement can be easily filtered based on received signal strength so that the most proximate low energy wireless communication beacon can be selected.

Those skilled in the art will recognize the term advertisement in the context of low energy wireless communication protocols refers to a specifically formatted message intended to allow other devices to know the presence of the low energy wireless communication device transmitting the advertisement, and depending upon the particular format of the advertisement can allow a connection to the low energy wireless communication device transmitting the advertisement. According to BLE protocol, the advertisement is transmitted as a packet that includes a 1 byte preamble, 4 byte access address, an 8-39 byte packet data unit (PDU) containing advertising information or data, and a 3 byte cyclic redundancy check (CRC). BLE protocol provides for a number of different types of advertisement PDUs, which include a 2 byte header and a 6-37 byte payload.

The specific type of advertisement PDU employed will depend upon implementation. For example, in a location tracking implementation, the endpoint wireless communication device can transmit an advertisement PDU that is used when a connection is not accepted because the location tracking may only involve the transmission of the advertisement from the endpoint wireless communication device. In contrast, in a possible embodiment for a store-specific information implementation (described in more detail below), the endpoint wireless communication can transmit an advertisement PDU that is used when a connection is accepted because the low energy wireless communication beacon will be transmitting information back to the endpoint wireless communication device that transmitted the advertisement.

In another implementation, the low energy wireless communication beacons can transmit store-specific information (e.g., coupons, store hours, store map, etc.) to endpoint wireless communication devices. For example, if store $602_1$ is a clothing retailer, when low energy wireless communication beacon $604_1$ receives an advertisement from an endpoint wireless communication device (not illustrated) that is within communication radius $606_1$, the low energy wireless communication beacon $604_1$ transmits an identification of the endpoint wireless communication device to server 608 (either directly or through the other low energy wireless communication beacons) using a low energy wireless communication protocol over wireless communication link $610_1$ and inter-beacon communication links as will be discussed later with regard to FIG. 8. In one embodiment, only one wireless communication link $610_x$ is present between the plurality of the low energy wireless communication beacons and server 608. Note that FIG. 6 does not show the communication links between the low energy wireless communication beacons. Server 608 then returns information to the low energy wireless communication beacon $604_1$ via wireless communication link $610_1$ and/or the inter-beacons communication links, which is then sent from the low energy wireless communication beacon $604_1$ to the endpoint wireless communication device that transmitted the advertisement. The information returned by server 608 and provided to the endpoint wireless communication device can be store-specific information, such as a coupon, store hours, store map, etc. Depending upon implementation, the store-specific information can vary depending upon endpoint wireless communication device that transmitted the advertisement. For example, server 608 can provide different coupons to different endpoint wireless communication devices based on any number of factors, such as previous purchases by a user of the endpoint wireless communication device, etc.

Low energy wireless communication beacons $604_2$-$604_x$ operate in a similar manner for tracking the location of an endpoint wireless communication device. It should be recognized that due to the size of the communication radius of beacons $604_1$-$604_x$, an endpoint wireless communication device should only receive store-specific information for the particular store in which the endpoint wireless communication device is located. Thus, an endpoint wireless communication device located in store $602_2$ will receive store-specific information from low energy wireless communication beacon $604_2$ and not from low energy wireless communication beacons $604_1$ or $604_x$.

Figure 7:
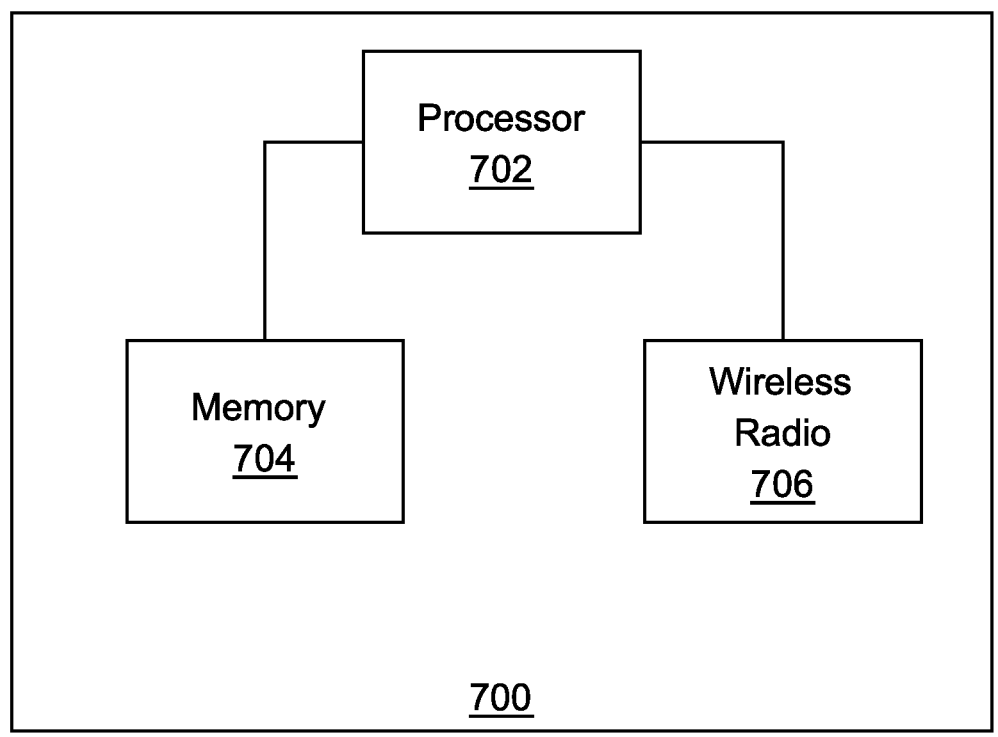
FIG. 7 is a schematic diagram of a low energy wireless communication beacon according to an embodiment.

FIG. 7 is a schematic diagram of a low energy wireless communication beacon according to an embodiment. The low energy wireless communication beacon 700 can be a BLE wireless communication beacon configured to operate in the manner described herein. The low energy wireless communication beacon 700 includes a processor 702 coupled to a memory 704 and a low energy wireless communication radio 706, all of which are configured to operate in the manner described herein. Specifically, the low energy wireless communication radio 706 is configured to transmit advertisements, scan for advertisements, and communicate information over a backhaul communication link using only a low energy wireless communication protocol. Thus, the low energy wireless communication beacon 700 does not require an endpoint wireless communication device for configuration or for communicating data over a backhaul communication link. Nor does the low energy wireless communication beacon require a wide area network wireless radio for configuration or for communicating data over a backhaul communication link. Thus, the low energy wireless communication beacon can be relatively simple to manufacture and can be relatively inexpensive. In one embodiment, the processor 702 is configured to control the low energy wireless communication radio 706 to communicate with an endpoint wireless communication device using a low energy wireless communication protocol and communicate information over a backhaul communication link using the low energy wireless communication protocol.

In an embodiment, the communication of the low energy wireless communication beacon with the endpoint wireless communication device can comprises at least one of: broadcasting an advertisement by the low energy wireless communication beacon, wherein the broadcasted advertisement is received by the endpoint wireless communication device; broadcasting an advertisement by the endpoint wireless communication device, wherein the broadcasted advertisement is received by the low energy wireless communication beacon; and broadcasting an advertisement by the low energy wireless communication beacon and scanning for an advertisement by the low energy wireless communication beacon.

Because the disclosed low energy wireless communication beacon 700 is able to use the low energy wireless communication radio 706 to communicate data over a backhaul communication link, the endpoint communication devices do not need a wide area network wireless radio to provide the functionality in a beacon system, and thus endpoint communication devices can have the same configuration as the low energy wireless communication beacon 700. This allows for low cost endpoint wireless communication devices, which expands the applications for such devices (e.g., an activity tracker, such as a Fitbit activity tracker).

Advantageous applications of an endpoint wireless communication device that includes only a single radio, i.e., a low energy wireless communication radio, include location tracking, fitness and health wearables, and home automation. For example, a plurality of low energy wireless communication beacons can be arranged in a shopping mall in communication range of each other and a child can have an endpoint wireless communication device that transmits advertisements to proximately located low energy wireless communication beacons, which then use a low energy wireless communication backhaul communication link to provide location information to a server that can track the child's location. This type of location tracking can also be employed for animals, as well as physical assets within, for example, a warehouse.

For ease of explanation, the schematic diagram of FIG. 7 does not illustrate all of the components of the low energy wireless communication beacon 700, such as an antenna and energy source. Further, a low energy wireless communication beacon 700 can include other components. To achieve the advantages disclosed herein, however, the low energy wireless communication beacon 700 should only include a single radio, i.e., the low energy wireless communication radio. In other words, in one embodiment, there is only one radio in the low energy wireless communication beacon 700. Further, when an endpoint wireless communication device employs the arrangement illustrated in FIG. 7, it can include additional components, such as input device, output devices, etc.

FIG. 8 is a block diagram of a low energy wireless communication network according to an embodiment. The system 800 includes a plurality of low energy wireless communication beacons $802_1$-$802_x$, each arranged so that it is within a communication radius $804_1$-$804_x$ of another one of the low energy wireless communication beacons $802_1$-$802_x$. Low energy wireless communication beacon $802_1$ can receive an advertisement from endpoint communication device 806 via low energy wireless communication link $808_1$, and forward the advertisement to server 814 via low energy wireless communication beacons $802_2$ and $802_x$ using a low energy wireless communication link $808_2$. Specifically, low energy wireless communication beacon $802_2$ forwards the advertisement received from low energy wireless communication beacon $802_1$ to low energy wireless communication beacon $802_x$ via low energy wireless communication link $808_3$, which in turn forwards the advertisement to server 814 via low energy wireless communication link $808_x$. In one possible embodiment, the links $802_2$, $802_3$ and $802_x$ can be formed by encoding information in the advertisement packets. In one embodiment, the low energy wireless communication beacon $802_x$ can communicate using a wide area network radio, in which case low energy wireless communication beacon $802_x$ has two radios, one BLE and one wide area network, but all other beacons have only one radio.

One or more of the low energy wireless communication beacons $802_1$-$802_x$ can add information that is forwarded with the advertisement. For example, low energy wireless communication beacon $802_1$ can include its identification along with the forwarded advertisement, which allows the server 814 to determine an approximate location of the endpoint wireless communication device 806 based on a previously known location for low energy wireless communication beacon $802_1$. Additionally, each of the low energy wireless communication beacons $802_1$-$802_x$ can add their own identification or other information (e.g., scanned advertisements, battery level, etc.) to the forwarded advertisement. This allows the server 814 to perform a number of tasks, such as determining the location of all endpoint wireless communication devices within the beacon infrastructure, compute and optimizes the local network paths traveled by the advertisement, and/or other network maintenance tasks. In one application, low energy wireless communication beacons $802_1$-$802_x$ can form an ad-hoc network and one beacon can communication with a plurality of other beacons.

Server 814 identifies information associated with the advertisement and forwards this information to endpoint wireless communication device 806 using low energy wireless communication beacons $802_1$-$802_x$ via the low energy wireless communication links $808_1$-$808_x$. Specifically, server 814 forwards the associated information via low energy wireless communication link $808_x$ to low energy wireless communication beacon $802_x$, which in turn forwards the associated information to low energy wireless communication beacon $802_2$ via low energy wireless communication link $808_3$. Low energy wireless communication beacon $802_2$ forwards the associated information to low energy wireless communication beacon $802_1$ via low energy wireless communication link $808_2$, which then forwards the associated information to endpoint communication device 806 via low energy wireless communication link $808_1$. In one embodiment, low energy wireless communication beacon $802_1$ is configured such that the range of low energy wireless communication link low $808_1$ is shorter than the range of low energy wireless communication link $802_2$ so that endpoint wireless communication device 806 receives information only related to the location of low energy wireless communication beacon $802_1$.

In another embodiment, server 814 can be replaced by a gateway or other edge device, which communicates with low energy wireless communication beacon $802_x$ via the low energy wireless communication link $808_x$ and which forwards the advertisement to a server in another network using a wired or wireless wide area network communication link.

The particular network arrangement in FIG. 8 is but one example of a network and the low energy wireless communication beacons $802_1$-$802_x$ can be arranged in any type of network arrangement, including a mesh network or a structured network. Further, conventional network techniques, such as self-healing, multi-hopping, etc., can be implemented in the network 800.

Figure 9:
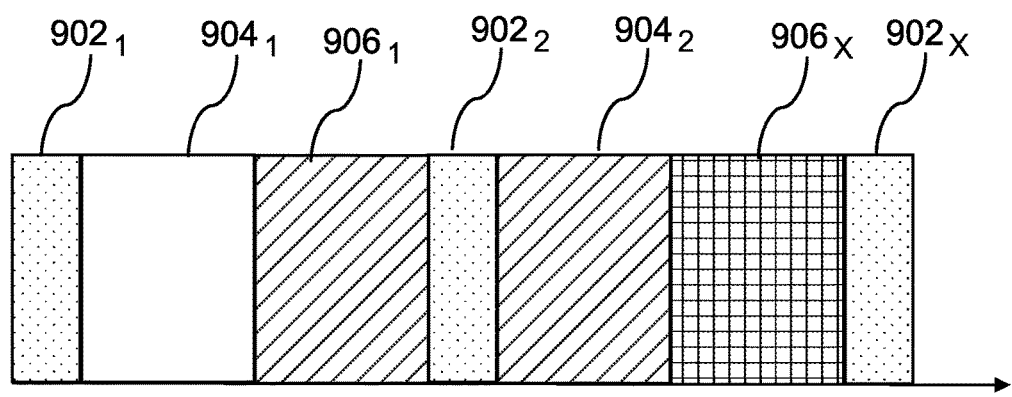
FIG. 9 is a timing diagram of low energy wireless communication beacon communication in the system of FIG. 8.

FIG. 9 is a timing diagram of low energy wireless communication beacon communication in the system of FIG. 8. Each of the low energy wireless communication beacons $802_1$-$802_x$ communicates using the time intervals $902_1$-$902_x$, $904_1$-$904_x$, and $906_1$-$906_x$. Specifically, time intervals $902_1$-$902_x$ are employed for transmitting advertisements to endpoint wireless communication devices and other low energy wireless communication beacons, time intervals $904_1$-$904_x$ are employed for scanning for advertisements from other beacons and endpoint wireless communication devices, and time intervals $906_1$-$906_x$ are employed for communicating backhaul data to and from a server via other low energy wireless communication beacons. Transmitting the backhaul data to and from the server during time intervals $906_1$-$906_x$, which are the idle time intervals between advertisement transmissions time intervals $902_1$-$902_x$, the backhaul communications are compatible with all prior low energy wireless communication applications.

Although FIG. 9 illustrates time intervals $902_1$-$902_x$, $904_1$-$904_x$, and $906_1$-$906_x$ as being contiguous in time, additional time intervals can be inserted between each of time intervals $902_1$-$902_x$, $904_1$-$904_x$, and $906_1$-$906_x$ to avoid interfering communications. Further, the time intervals represent the maximum time for a particular type of communication and the entire interval need not be employed for any of the particular types of communication. Thus, the backhaul data may be able to be communicated using less than the entire interval of one of backhaul time intervals $906_1$-$906_x$. Thus, the low energy wireless communication beacons $802_1$-$802_x$ can communicate both advertisements and backhaul data using a single low energy wireless communication radio. It should be recognized that the time intervals illustrated in FIG. 9 will not necessarily be aligned for each of the low energy wireless communication beacons $802_1$-$802_x$. Further, the sequence of time intervals need not be the same or fixed.

Figure 10:
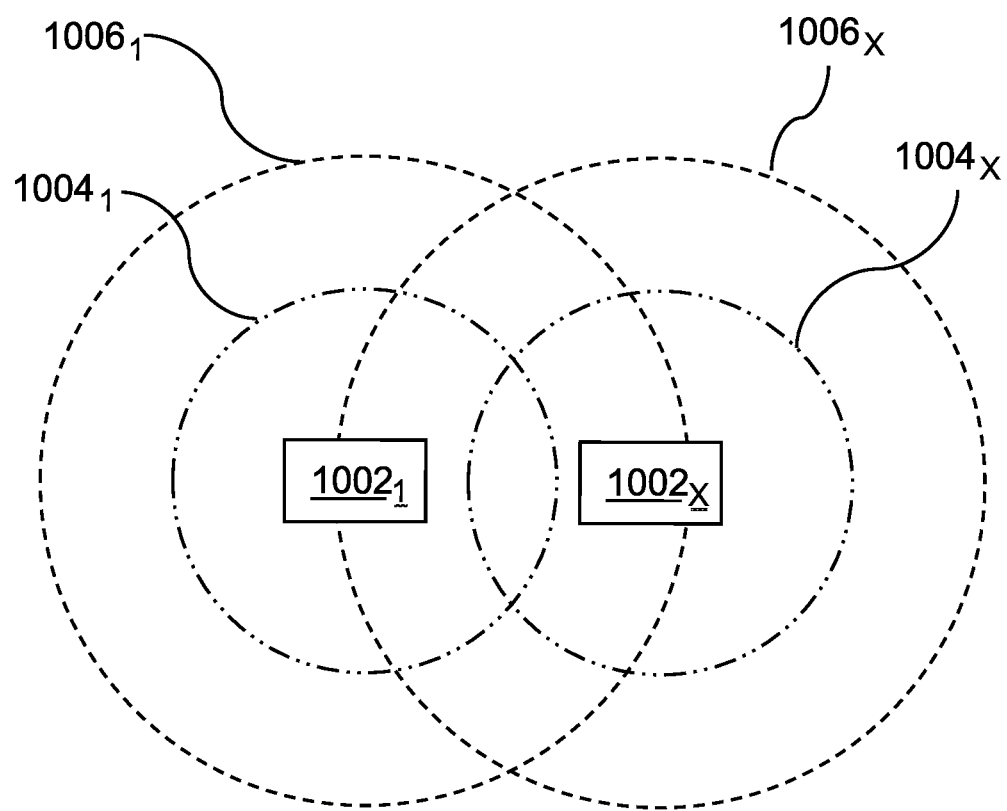
FIG. 10 is a block diagram of a network of two low energy wireless communication beacons according to an embodiment.

Finally, the low energy wireless communication beacon can be arranged to employ different transmission power levels for advertisement and data transmissions than for backhaul transmissions. An example of this is illustrated in FIG. 10, in which low energy wireless communication beacon $1002_1$ provides communication radii $1004_1$ and $1006_1$ and low energy wireless communication beacon $1002_x$ provides communication radii $1004_x$ and $1006_x$. The different communication radii are achieved using different transmission power levels. The low energy wireless communication beacons $1002_1$-$1002_x$ can use the smaller communication radii $1004_1$-$1004_x$ for transmitting advertisements and the larger communication radii $1006_1$-$1006_x$ for backhaul communications to and from the server. By using the smaller communication radii $1004_1$-$1004_x$ for transmitting advertisements, the low energy wireless communication beacons $1002_1$-$1002_x$ can prevent, or limit, reception of these advertisements by other low energy wireless communication beacons $1002_1$-$1002_x$ so that the advertisements are received only by endpoint wireless communication devices.

The disclosed embodiments provide devices, systems, and methods for low energy wireless communication. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, comprising:
   receiving, by a low energy wireless communication beacon, an advertisement, from an endpoint wireless communication device, using a low energy wireless communication protocol;
   communicating, between the low energy wireless communication beacon and a server, the advertisement over a backhaul communication link using the low energy wireless communication protocol, wherein the advertisement includes a position of the endpoint wireless communication device;
   returning information from the server, over the backhaul communication link, to the low energy wireless communication beacon, wherein the information is associated with the position of the endpoint wireless communication device; and
   providing the information to the endpoint wireless communication device, from the low energy wireless communication beacon, using the low energy wireless communication protocol.

2. The method of claim 1, further comprising:
   performing, by the low energy wireless communication beacon, actions based on the information, wherein the information is device or advertisement configuration information.

3. The method of claim 1, further comprising:
   scanning, by the low energy wireless communication beacon, for advertisements using the low energy wireless communication protocol.

4. The method of claim 3, wherein the scanning is performed during one of a plurality of scanning time periods and the information is communicated over the backhaul communication link during one of a plurality of backhaul time periods, wherein the plurality of scanning time periods and the plurality of backhaul time periods are non-overlapping time periods.

5. The method of claim 1, further comprising:
wherein the information includes data related to a store at the position.

6. The method of claim 5, wherein the data includes coupons and the data is selected by the server based on previous purchases by a user of the endpoint wireless communication device.

7. The method of claim 5, wherein the low energy wireless communication beacon and the endpoint wireless communication device each have only a single radio, wherein the single radio is capable of communicating exclusively using the low energy wireless communication protocol.

8. The method of claim 7, further comprising:
broadcasting, by the low energy wireless communication beacon, the advertisement at a first energy level using the single radio; and
communicating the information between the low energy wireless communication beacon and the server at a second energy level using the single radio, wherein the second energy level is higher than the first energy level.

9. The method of claim 5, wherein the information includes information identifying the low energy wireless communication beacon to the server.

10. The method of claim 9, further comprising:
tracking the location of the endpoint wireless communication device using the information identifying the low energy wireless communication beacon.

11. The method of claim 5, wherein the endpoint wireless communication device includes a first radio capable of exclusively communicating using the low energy wireless communication protocol and a second radio capable of communicating using a wide area network communication protocol.

12. The method of claim 1, further comprising:
forwarding, by the server, the information to another server via a communication protocol other than the low energy wireless communication protocol.

13. The method of claim 1, wherein the low energy wireless communication protocol is Bluetooth Low Energy wireless communication protocol.

14. A low energy wireless communication beacon, comprising:
a processor;
a memory coupled to the processor; and
a low energy wireless communication radio coupled to the processor,
wherein the processor is configured to control the low energy wireless communication radio to receive an advertisement from an endpoint wireless communication device using a low energy wireless communication protocol, wherein the advertisement includes a position of the endpoint wireless communication device,
communicate to a server the advertisement over a backhaul communication link using the low energy wireless communication protocol,
receive information from the server, over the backhaul communication link, wherein the information is associated with the position of the endpoint wireless communication device, and
provide the information to the endpoint wireless communication device using the low energy wireless communication protocol.

15. The low energy wireless communication beacon of claim 14, wherein the communication of the low energy wireless communication beacon with the endpoint wireless communication device includes data related to a store at the position of the endpoint wireless communication device.

16. The low energy wireless communication beacon of claim 14, wherein the processor is configured to communicate exclusively using the low energy wireless communication radio.

17. The low energy wireless communication beacon of claim 14, wherein the low energy wireless communication radio is configured to communicate with the endpoint wireless communication device using a first energy level and to communicate over the backhaul link using a second energy level, which is greater than the first energy level.

18. A system, comprising:
a first low energy wireless communication beacon communicatively coupled to an endpoint wireless communication device via a low energy wireless communication protocol;
a second low energy wireless communication beacon communicatively coupled to the first low energy wireless communication beacon via the low energy wireless communication protocol; and
a server communicatively coupled to the second low energy wireless communication beacon via the low energy wireless communication protocol,
wherein the first and second low energy wireless communication beacons each have only a single radio, wherein the single radio is capable of communicating exclusively using the low energy wireless communication protocol,
wherein the first energy wireless communication beacon receives from the endpoint wireless communication device an advertisement, which includes a position of the endpoint wireless communication device, sends the advertisement to the server through the second energy wireless communication beacon, receives from the server information associated with the position of the endpoint wireless communication device, and provides the information to the endpoint wireless communication device exclusively using the low energy wireless communication protocol.

19. The system of claim 18, wherein the low energy wireless communication protocol is Bluetooth Low Energy wireless communication protocol.

20. The system of claim 18, wherein the first low energy wireless communication device is configured to communicate with the endpoint wireless communication device using a first energy level and configured to communicate with the second low energy wireless communication beacon using a second energy level, which is higher than the first energy level.

* * * * *